United States Patent
Chopra et al.

(10) Patent No.: US 11,636,269 B2
(45) Date of Patent: Apr. 25, 2023

(54) CONTENT CREATION AND PRIORITIZATION

(71) Applicant: FMR LLC, Boston, MA (US)

(72) Inventors: Ankush Chopra, Bangalore (IN); Shruti Agrawal, Bangalore (IN)

(73) Assignee: FMR LLC, Boston, MA (US)

( * ) Notice: Subject to any disclaimer, the term of this patent is extended or adjusted under 35 U.S.C. 154(b) by 320 days.

(21) Appl. No.: 17/071,327

(22) Filed: Oct. 15, 2020

(65) Prior Publication Data

US 2022/0121820 A1 Apr. 21, 2022

(51) Int. Cl.
*G06F 40/289* (2020.01)
*G06F 16/2458* (2019.01)
*G06F 16/9032* (2019.01)
*G06N 20/00* (2019.01)
*G06F 40/211* (2020.01)
*G06F 40/30* (2020.01)

(52) U.S. Cl.
CPC ........ *G06F 40/289* (2020.01); *G06F 16/2465* (2019.01); *G06F 16/2468* (2019.01); *G06F 16/90332* (2019.01); *G06N 20/00* (2019.01); *G06F 40/211* (2020.01); *G06F 40/30* (2020.01)

(58) Field of Classification Search
None
See application file for complete search history.

(56) References Cited

U.S. PATENT DOCUMENTS

| | | |
|---|---|---|
| 7,487,095 B2 | 2/2009 | Hill et al. |
| 7,606,714 B2 | 10/2009 | Williams et al. |
| 8,543,565 B2 | 9/2013 | Feng |
| 10,445,745 B1 * | 10/2019 | Chopra ............... G06F 16/3344 |
| 10,861,022 B2 * | 12/2020 | Gupta ................... G06F 40/166 |
| 10,929,392 B1 * | 2/2021 | Cheng ................... G06F 16/242 |

(Continued)

OTHER PUBLICATIONS

Reimers, Nils, and Iryna Gurevych. "Sentence-bert: Sentence embeddings using Siamese bert-networks." arXiv preprint arXiv: 1908.10084 (2019). (Year: 2019).*

(Continued)

*Primary Examiner* — Douglas Godbold
(74) *Attorney, Agent, or Firm* — Cesari and McKenna, LLP

(57) ABSTRACT

A computerized method is provided for automatically determining answers to a plurality of questions. The method includes automatically discovering a plurality of questions by processing historical data related to prior customer interactions. The automatically discovering includes applying a linguistic analytical model on the data related to historical customer interactions to detect the plurality of questions, vectoring the plurality of questions to generate mathematical representations of the questions, and grouping the plurality of questions into one or more clusters in accordance with similarities of the questions as measured based on their mathematical representations. The method also includes identifying the questions that do not have an existing answer. The method further includes determining at least one probable answer to each of the representative questions using a content mining technique that mines pertinent data from one or more identified content sources.

19 Claims, 7 Drawing Sheets

(56) References Cited

U.S. PATENT DOCUMENTS

| | | | |
|---|---|---|---|
| 11,188,447 B2* | 11/2021 | Kalia | G06F 8/10 |
| 2016/0062980 A1* | 3/2016 | Boguraev | G06N 5/04 |
| | | | 706/11 |
| 2018/0075016 A1* | 3/2018 | Bennett | G06N 5/04 |
| 2018/0260873 A1 | 9/2018 | Chandramouli et al. | |
| 2018/0308473 A1* | 10/2018 | Scholar | A63F 13/00 |
| 2020/0020318 A1* | 1/2020 | Canada | G06N 5/04 |
| 2020/0110768 A1* | 4/2020 | Bender | G06F 16/3332 |
| 2020/0167417 A1* | 5/2020 | Li | G06K 9/6298 |
| 2020/0227026 A1* | 7/2020 | Rajagopal | G06F 16/244 |
| 2020/0250277 A1* | 8/2020 | Mallette | G06F 40/35 |
| 2020/0311738 A1* | 10/2020 | Gupta | G06F 16/22 |
| 2021/0151135 A1* | 5/2021 | Hussam | G16H 40/20 |
| 2021/0165792 A1* | 6/2021 | Darbey | G06F 16/24522 |
| 2021/0311973 A1* | 10/2021 | Radhakrishnan | G06F 16/36 |
| 2021/0382946 A1* | 12/2021 | Beller | G06F 16/24578 |
| 2021/0398118 A1* | 12/2021 | Stark | G06T 7/0002 |
| 2021/0406913 A1* | 12/2021 | Yao | G06N 20/00 |

OTHER PUBLICATIONS

Othman, Nouha, Rim Faiz, and Kamel Smaïli. "Enhancing question retrieval in community question answering using word embeddings." Procedia Computer Science 159 (2019): 485-494. (Year: 2019).*

* cited by examiner

CONTENT CREATION AND PRIORITIZATION

TECHNICAL FIELD

This application relates generally to systems, methods and apparatuses, including computer program products, for mining and determining answers to one or more questions that are automatically identified from prior customer interactions with an enterprise.

BACKGROUND

In the present time of dynamic technological growth, the rapidly-changing technology landscape drives changes in the way products and services are offered to customers. For example, organizations can now sell products and services through a variety of channels, such as websites, mobile applications, and telephones. As a result, customers may have many questions and often attempt to find answers to these questions on their own using different approaches, such as online searches, automated call services, and customer virtual assistance. Further, customer questions are dynamic, as they change over time in response to, for example, changes in product offerings, website structures, service channels, and market conditions. If the customers cannot easily find answers themselves, they are likely to contact the organization to seek human assistance. More often than not, answers to these questions are already present on the organization's public websites or internal knowledge portals.

Therefore, systems and methods are needed that can automatically identify popular consumer questions across different sales platforms for which the company doesn't have curated answers. There is also a need to automatically and intelligently determine answers to these questions based on existing content with minimal human intervention.

SUMMARY

The systems and methods of the present invention can identify frequently-asked questions from across different sales channels and determine answers to these questions based on published digital content using automated information retrieval and text mining techniques. Thus, the present invention enables faster and more efficient content creation by prioritizing content that has more demand, which drives standardization and operational efficiency. In some embodiments, the systems and methods of the present invention are domain independent so that they can be used on a variety of computing platforms and across many different types of industries such as banking and financial services, telecom, e-retail, etc.

In one aspect, a computer-implemented method is provided for automatically determining answers to a plurality of customer questions. The method includes automatically discovering, by a computing device, a plurality of questions by processing historical data related to prior customer interactions. The automatically discovering step includes applying, by the computing devices, a linguistic analytical model on the data related to historical customer interactions to detect the plurality of questions and vectoring, by the computing device, the plurality of questions to generate mathematical representations of the questions. Each mathematical representation preserves syntactic and sematic meaning of the corresponding question. The automatically discovering step also includes grouping, by the computing device, the plurality of questions into one or more clusters in accordance with similarities of the questions as measured based on their mathematical representations, where each cluster is assigned a representative question. The method further includes automatically determining, by the computing devices, at least one probable answer to each of the representative questions using a content mining technique that mines pertinent data from one or more identified content sources.

In another aspect, a computerized system is provided for automatically determining answers to a plurality of questions. The computerized system includes a question discovery engine for automatically discovering a plurality of questions by processing historical data related to prior customer interactions. The question discovery engine includes a question detection module configured to apply a linguistic analytical model on the data related to historical customer interactions to detect the plurality of questions. The question discovery engine also includes a question vectorization module configured to vectorize the plurality of questions to generate mathematical representations of the questions. Each mathematical representation preserves syntactic and sematic meaning of the corresponding question. The question discovery engine further includes a question clustering module configured to group the plurality of questions into one or more clusters based on similarities of the questions as measured based on their mathematical representations, where each cluster is assigned a representative question. Additionally, the computerized system includes an answer mining engine for automatically determining at least one probable answer to each of the representative questions using a content mining technique. The answer mining engine includes a data scraping module configured to mine pertinent data from one or more content sources and an indexing module configured to index the mined data based on key phrases extracted from the mined data. The answer mining engine also includes a query module configured to query the indexed data using the representative question from each of the one or more clusters to determine one or more sections of the indexed data that match the representative question to within a predetermined degree of tolerance. The answer mining engine further includes an extraction module configured to formulate the at least one probable answer for the representative question of each cluster based on the one or more matched sections.

Any of the above aspects can include one or more of the following features. In some embodiments, automatically determining the at least one probable answer includes indexing, by the computing device, the mined data based on key phrases extracted from the mined data and querying, by the computing device, the indexed data using the representative question from each of the one or more clusters to determine one or more sections of the indexed data that match the representative question to within a predetermined degree of tolerance. Automatically determining the at least one probable answer also includes formulating, by the computing device, the at least one probable answer for the representative question of each cluster based on the one or more matched sections.

In some embodiments, a Siamese deep learning model is applied on the plurality of questions to generate the mathematical representations of the questions.

In some embodiments, an agglomerative hierarchical clustering algorithm is applied to generate the one or more clusters, and an average similarity of the questions with each other in each cluster is above a predefined threshold. In some embodiments, the representative question of each cluster has the highest average similarity with the other questions of the same cluster. In some embodiments, for each cluster, a strength level is determined that indicates a combined frequency of occurrence of the questions in the cluster. The representative question of the cluster is correlated to the strength level.

In some embodiments, for each incoming question, a database is queried to determine if there exists an answer to the incoming question prior to automatically determining a probable answer using the content mining technique. Querying the database includes calculating a similarity score between the incoming question and each question in the database using an ensemble deep learning model for similarity detection and marking a question in the database as same to the incoming question if the similarity score is above a predefined threshold. In some embodiments, the ensemble deep learning model is based on a plurality of scores that measure different types of similarity between a pair of the incoming question and a question in the database. The plurality of scores can comprises a normalized score of preprocess question pair from using a Siamese deep learning model, an un-normalized score of the question pair without preprocessing using the Siamese deep learning model, a syntactic fuzzy match score of the question pair, and a cosine similarity score of the question pair based on average embedding of each question in the question pair.

In some embodiments, formulating the one or more probable answers includes decomposing the one or more matched sections into a plurality of probable answers and scoring the probable answers using a supervised learning algorithm to predict a degree of match between each probable answer and the corresponding representative question. At least one probable answer is extracted from the plurality of probable answers that has a degree of match greater than a predetermined threshold. In some embodiments, the supervised learn algorithm is a convolutional neural network based answer extraction algorithm.

In some embodiments, the one or more probable answers are transmitted to a content creator to perform at least one of verification or modification.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

In one aspect, the present invention features a two-stage approach, where the first stage involves automatically identifying questions from data that is representative of historical interactions between customers and a company, and the second stage involves automatically determining/mining answers to the questions from the first stage. For example, in the first stage, systems and methods are developed to perform cross-channel customer interaction analysis, channel-specific data cleaning, and sentence tokenization and question identification to extract pertinent questions from the customer interaction data. Also in the first stage, similar questions can be clustered and the resulting clustered questions are searched in a database to determine whether answers already exist for these questions. In the second stage, for questions identified in the first stage that do not have preexisting answers, pertinent content is extracted from specific content sources and indexed in a manner to support answer mining, followed by querying the indexed content with each question and using a trained model to determine top answers to the question. Also in the second stage, a content creator can edit the algorithmically mined answers to improve accuracy and provide feedback to the answer mining algorithm. The systems and methods in this two-stage approach can be scaled to accommodate new customer interaction channels in the first stage and new source of information and knowledge base in the second stage.

Figure 1:
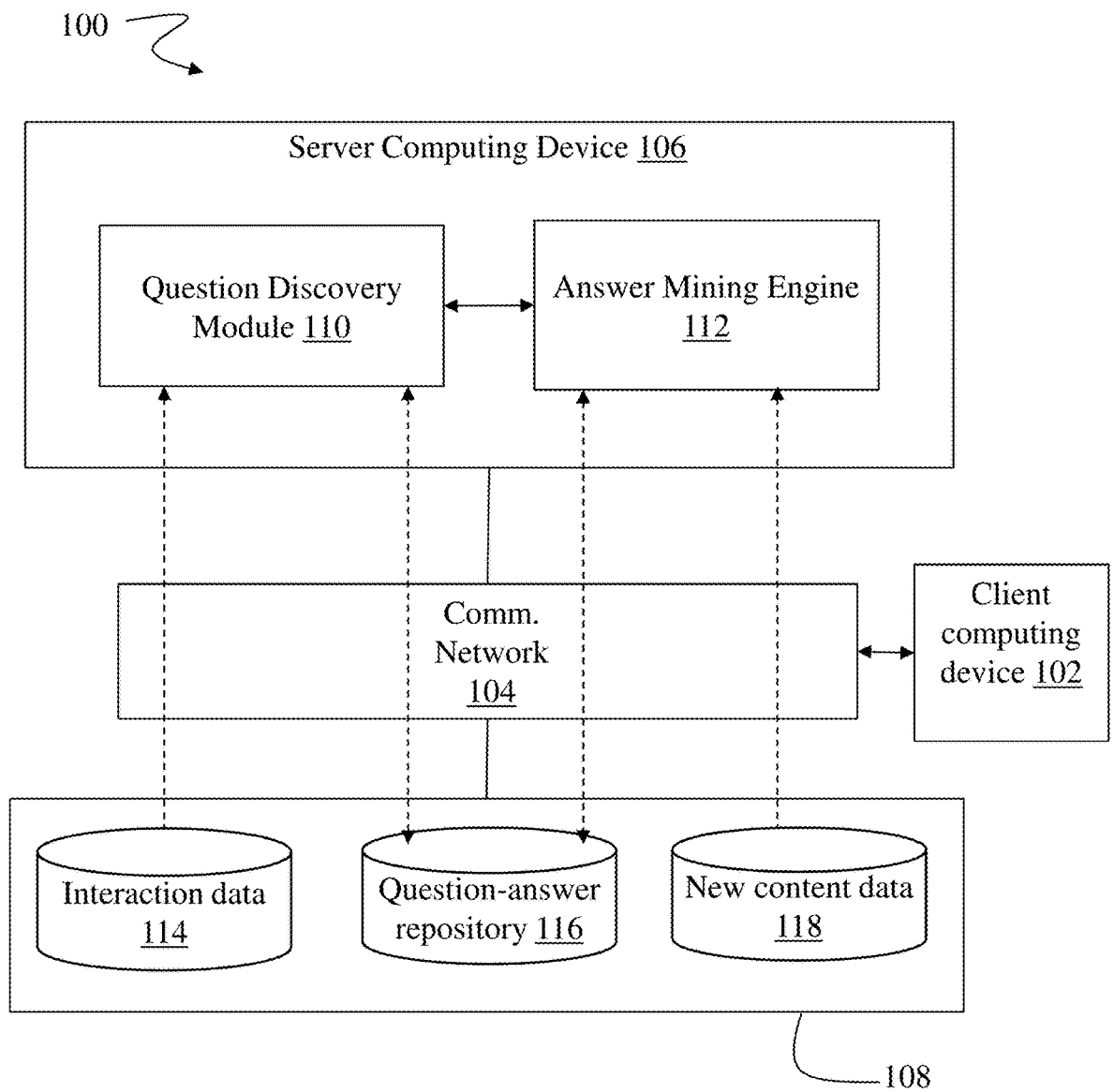
FIG. 1 is an exemplary diagram of a system used in a computing environment in which customer interaction data is analyzed for identification of customer questions and answers to these questions are automatically determined, according to some embodiments of the present invention.

FIG. 1 shows an exemplary diagram of a system 100 used in a computing environment in which customer interaction data is analyzed for identification of customer questions and answers to these questions are automatically determined, according to some embodiments of the present invention. As shown, the system 100 generally includes a client computing device 102, a communications network 104, a data store 108, and a server computing device 106.

The client computing device 102 connects to the communications network 104 to communicate with the server computing device 106 and/or the data store 108 to provide input and receive output relating to the process of analyzing data for identification of customer questions and determining answers to these questions as described herein. For example, the client computing device 102 can provide a detailed graphical user interface (GUI) that presents output resulting from the analysis methods and systems described herein, where the GUI can be utilized by an operator to review and/or modify questions and/or answers generated by the system 100. Exemplary client computing devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client device 102, it should be appreciated that the system 100 can include any number of client devices.

The communication network 104 enables components of the system 100 to communicate with each other to perform the process of analyzing data for identification of customer questions and mining answers to these questions as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware, including one or more processors and one or more physical memory modules and specialized software engines that execute on the processor of the server computing device 106, to receive data from other components of the system 100, transmit data to other components of the system 100, and perform functions as described herein. As shown, the processor of the server computing device 106 executes a question discovery module 110 and an answer mining engine 112, where the sub-components and functionalities of these components are described below in detail. In some embodiments, the components 110 and 112 are specialized sets of computer software instructions programmed onto a dedicated processor in the server computing device 106 and can include specifically-designated memory locations and/or registers for executing the specialized computer software instructions.

The data store 108 is a computing device (or in some embodiments, a set of computing devices) that is coupled to and in data communication with the server computing device 106 and is configured to provide, receive and store customer interaction data 114, question-answer repository 116, and new content data 118. The customer interaction data 114 describe past customer interactions, from which top customer questions are extracted. The question-answer repository 116 store existing answers to these questions. The new content data 118 is mined from various channels to address questions that do not yet have answers. Details regarding these different types of data is escribed below. In some embodiments, all or a portion of the data store 108 is integrated with the server computing device 106 or located on a separate computing device or devices. For example, the data store 108 can comprise one or more databases, such as MySQL™ available from Oracle Corp. of Redwood City, Calif.

Figure 2:
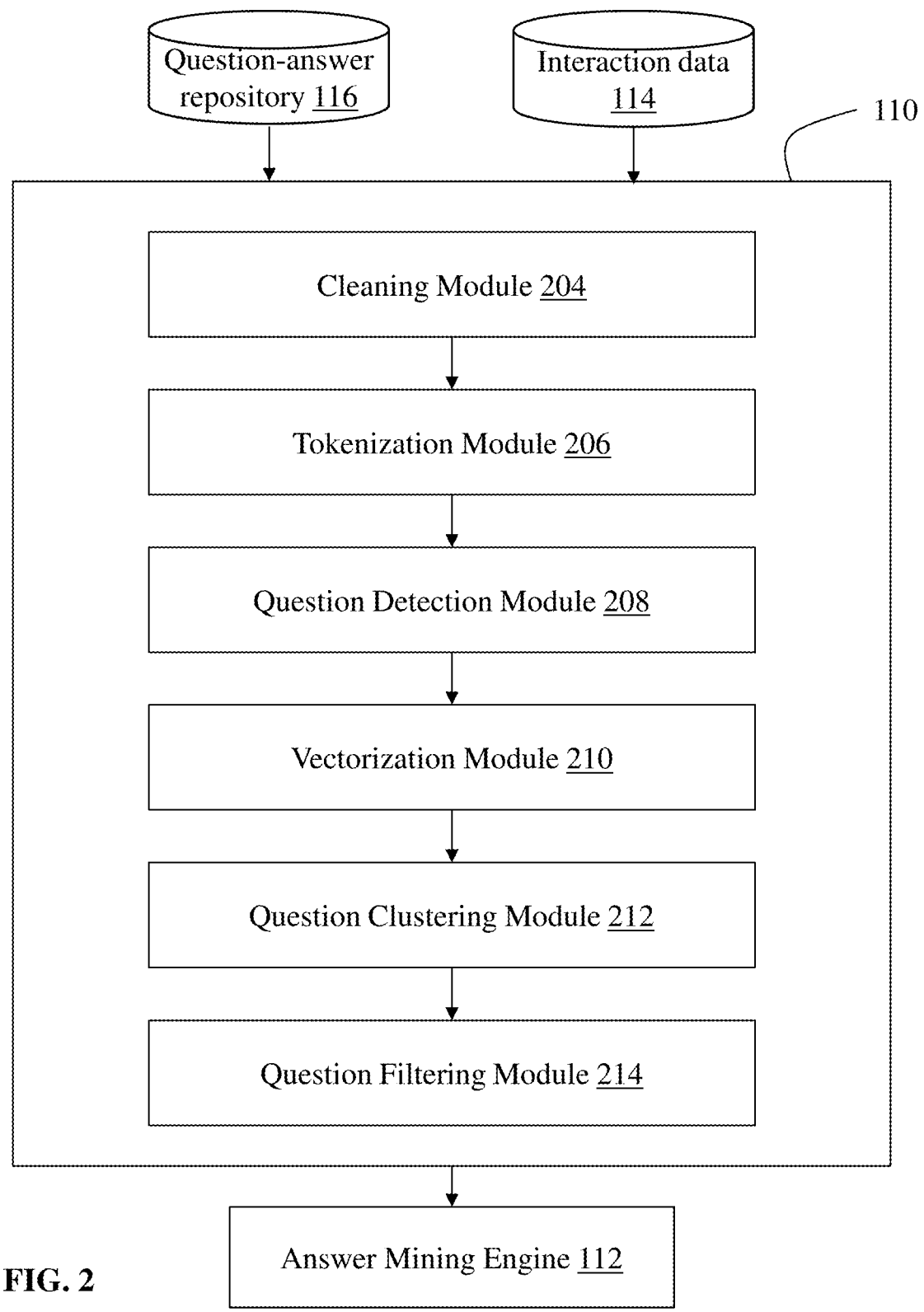
FIG. 2 shows an exemplary diagram of the question discovery module of the system of FIG. 1, according to some embodiments of the present invention.
Figure 3:
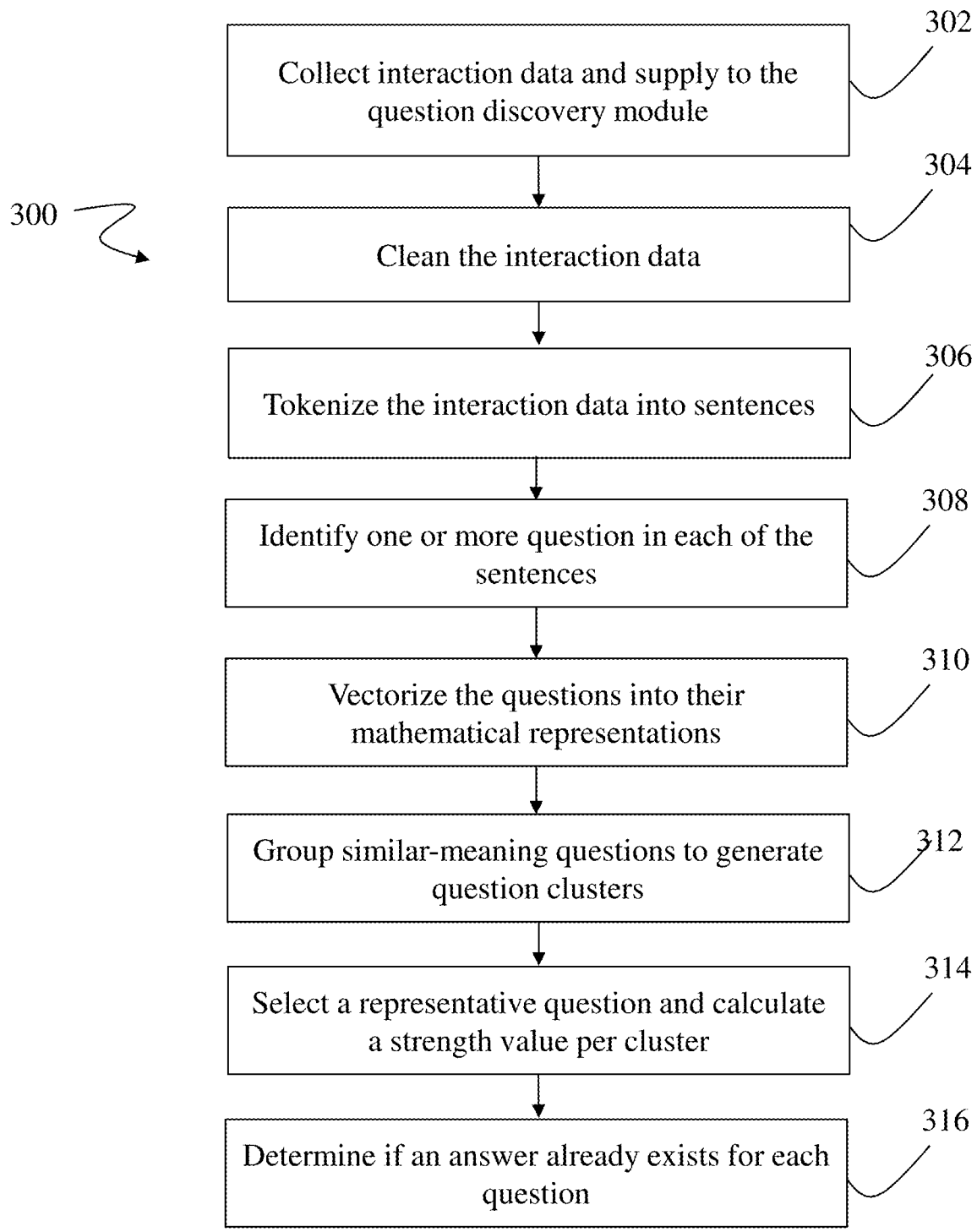
FIG. 3 shows an exemplary process executed by the question discovery module of FIG. 2 to automatically discover pertinent customer questions, according to some embodiments of the present invention.

FIG. 2 shows an exemplary diagram of the question discovery module 110 of the system 100 of FIG. 1, according to some embodiments of the present invention. The various components of the question discovery module 110, including one or more of a cleaning module 204, tokenization module 206, question detection module 208, vectorization module 210, question cluster module 212 and question filtering module 214, are described below in detail in relation to the process of FIG. 3. Specifically, FIG. 3 shows an exemplary process 300 executed by the question discovery module 110 of FIG. 2 to automatically discover pertinent customer questions, according to some embodiments of the present invention. This process 300 can be a stand-alone process or a first stage (i.e., a question discovery phase) of a two-stage process for determining answers to one or more customer questions related to a business enterprise.

First, the interaction data 114 is collected and supplied as an input to the question discovery module 110 (step 302). The interaction data 114 can be collected from various channels of customer interaction with a business enterprise and is adapted to capture historical interactions between customers and the business enterprise. In some embodiments, the interaction data 114 includes text-based clickstream data, which may include past customer queries/searches with one or more websites of the business enterprise to obtain information related to certain products and/or services provided by the enterprise. The interaction data 114 can also include search log data from public search engines related to the business enterprise. In some embodiments, the interaction data 114 includes transcripts of unstructured text capturing interactions between customers and company representatives. The unstructured computer text can comprise data derived from a variety of channels, including but not limited to voice-to-text transcripts (e.g., of customer service calls), customer service representative notes (e.g., entered by the representative into a terminal during a customer interaction), verbatim survey responses or other similar types of feedback, chat transcripts from online interactions, and so forth. In general, the system 100 is designed to extract data from existing and newer interaction channels as needed.

The cleaning module 204 of the question discovery module 110 is adapted to clean the received interaction data 114 prior to saving the data 114 to the data store 108 (step 304). Cleaning the interaction data 114 can involve one or more of combining data generated from the same conversation in one text, collapsing multiple whitespaces in a transcript into one, masking the data to replace sensitive or irrelevant customer information (e.g., names, social security numbers, laughter, etc.), removing search data only with stock tickers, and removing agent utterance from the data. In some embodiments, cleaning the interaction data involves identifying and removing meta-information in the recorded interaction data 114. For example, chat and call data can also include non-informative messages such as "party has left the session," which carry certain system meta-information. The cleaning module 204 of the question discovery module 110 is configured to tag these system messages as noise and remove them from the interaction data 114. In some embodiments, the cleaning module 204 is configured to remove non-unicode characters and non-informative symbols. In general, the cleaning module 204 is able to clean the data received from different interaction channels while accommodating channel-specific nuances.

The tokenization module 206 of the question discovery module 110 is configured to decompose the interaction data 114 for each customer interaction (e.g., conversation) into sentences so that the question discovery module 110 can individually examine each sentence for the possibility of being a potential customer question (step 306). In some embodiments, the tokenization module 206 is configured to perform sentence tokenization despite the presence of URLs or other artifact in the data 114. In some embodiments, the tokenization module 206 is configured to remove sentence chunks that have less than a certain number of words (e.g., 3 words) needed to form a proper question.

The question detection module 208 of the question discovery module 110 is configured to identify one or more questions in a given sentence, such a sentence produced by the tokenization module 206 (step 308). The question detection module 208 can apply a linguistic analytical model on the sentence by scoring the sentence for being a question or not and/or identifying the type of question asked (e.g. classifying the identified questions as "Wh questions" and/or "Yes/No questions"). The question detection module 208 is adapted to discard the non-question sentences and retain only the questions identified. The question detection module 208 can also process these questions by removing questions with low informational value, such as conversational questions and pleasantries. In some embodiments, the question detection module 208 further groups the questions that are substantially the same.

The vectorization module 210 of the question discovery module 110 is configured to vectorize the questions from the question detection module 208 to generate mathematical representations of the questions (step 310) for the purpose of grouping sentences with substantially the same meaning. In general, vectorization is applied to bring all the customer questions into the same frame of reference, which is important because two questions can mean the same while they look completely different or have different vocabulary. For example, the questions "How much money do I have?" and "What is my account balance?" have the same meaning but comprise different vocabulary. In some embodiments, the vectorization module 210 utilizes a Siamese-type deep learning model, such as a Siamese long short-term memory (LSTM) model, to obtain the vector/mathematical representation of the questions, where each mathematical representation preserves the syntactic and sematic meaning of the corresponding question to facilitate grouping of similar questions. In some embodiments, the vectorization module 210 is capable of generating a 75-dimensional vector as a mathematical representation for a given question.

After the questions are vectorized into their mathematical representations, the question clustering module 212 of the question discovery module 110 is configured to group similar-meaning questions to generate question clusters (step 312), which is helpful for gauging the popularity the questions and prioritizing them for answer determination. In some embodiments, the question clustering module 212 utilizes an agglomerative hierarchical clustering algorithm to perform clustering, as it is difficult to know the number of clusters beforehand and the agglomerative hierarchical clustering technique does not require this number apriori. The agglomerative hierarchical clustering algorithm receives as inputs questions in their vectorized form and identifies one or more groupings of the questions where the average similarity of the member questions with each other in the same cluster is above a certain threshold (e.g., between 0.7 and 0.9 depending on the business requirement). The question clustering module 212 can use cosine similarity to calculate the similarities among the questions. Both syntactic and semantic similarities are captured by the algorithm because it is applied on the questions in their vectorized form. In some embodiment, the question clustering module 212 normalizes the questions prior to applying the clustering algorithm, where normalization comprises subtracting the elements of a vector dimension by their mean and dividing the result by its standard deviation.

In some embodiments, the question clustering module 212 is further configured to select at least one representative question per cluster of questions that best represents the meaning of the questions in the cluster (step 314). This representative question can be the question in the cluster that has the highest average similarity with all the other questions within the same cluster. In some embodiments, the question clustering module 212 is further configured to calculate a strength/importance value of a cluster as it helps in prioritizing answer determination in a later stage (step 314). The strength value of each cluster can be calculated by adding the frequencies of the individual questions within the cluster. In some embodiments, the question clustering module 212 only selects for further processing those question clusters with high intra-cluster similarity and removes the remaining clusters. In some embodiment, the question clustering module 212 transforms the clusters so that they can be in an appropriate form for subsequent processing. In general, the question clustering module 212 is configured to provide an ordered list of clusters of questions, where each cluster is associated with a representative question and a strength value capturing the combined frequency of all the questions in the cluster.

The question filtering module 212 of the question discovery module 110 is configured to determine whether answers already exist for the questions from the question clustering module 212 (step 316). The question filtering module 212 makes such a determination using the data in the question-answer repository 116 of the data store 108 (shown in FIG. 1) that maintains a database of questions for which answers exist. Specifically, the question filtering module 212 can make the determination using a similarity algorithm (e.g., a cosine similarity algorithm) that receives as an input a representative question from each cluster and compares the representative question with the pre-answered questions in the repository 116 to generate a similarity score between the representative question and each pre-answered question. If a similarity score exceeds a pre-defined threshold, the representative question is marked as similar to the corresponding pre-answered question and is therefore considered to have the same answer as the pre-answered question. Thus, no further answer determination is needed for the representative question or other questions in the same cluster as the representative question. For those representative questions that are not similar to any pre-answered questions in the repository 116, the question filtering module 212 can transmit them to a second stage of the system 100 for answer mining/determination, such as to the answer mining engine 112 of the system 100 of FIG. 1. In general, the question filtering module 212 outputs a list of representative questions that needs to be answered, where each representative question is associated with a strength value indicating the relative importance of the question and its priority for answer determination in a later stage by the answer mining engine 112.

Figure 4:
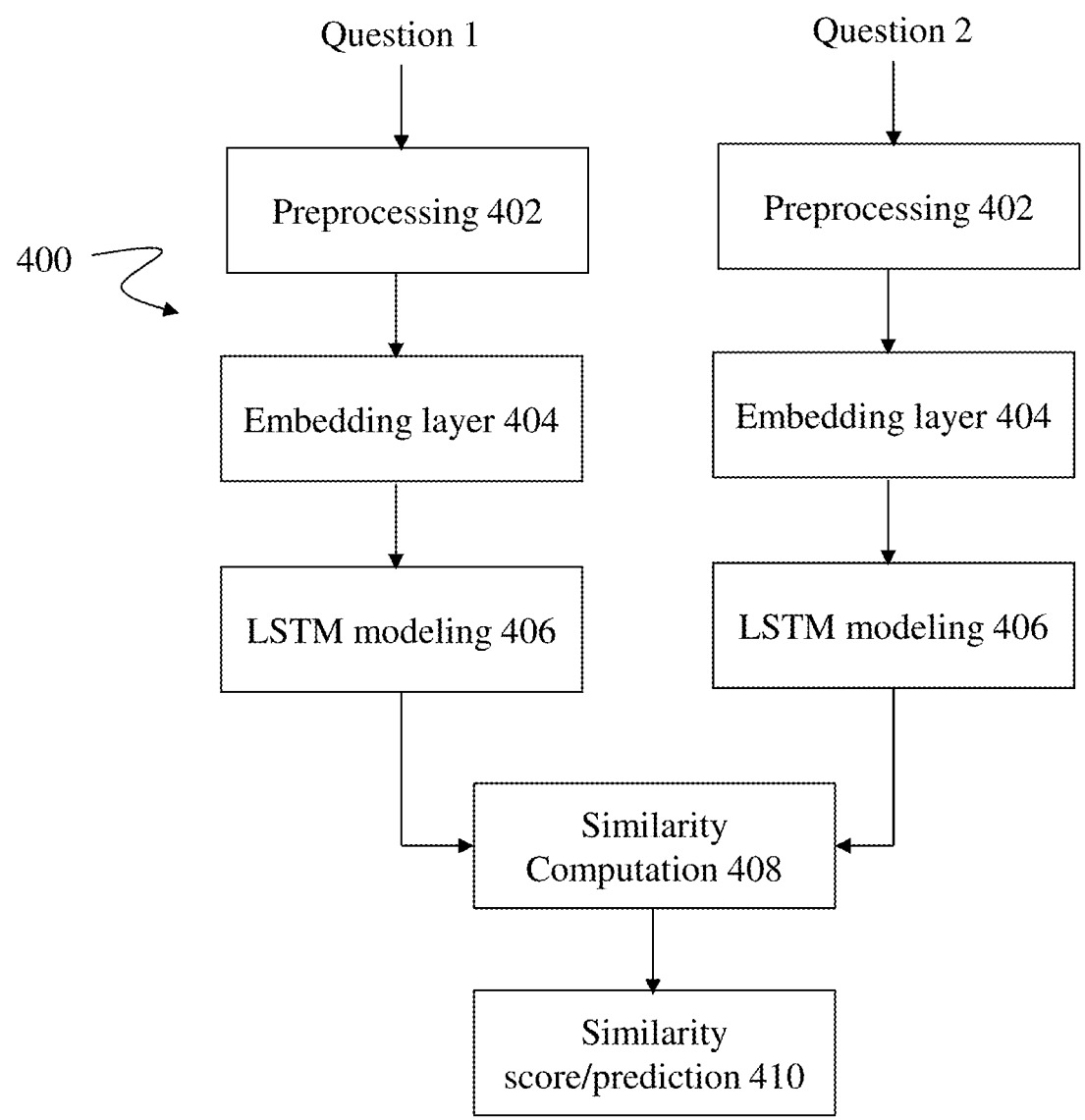
FIG. 4 shows an exemplary algorithm used by the vectorization module and the question filtering module of the question discovery module of FIG. 2, according to some embodiments of the present invention.

FIG. 4 shows an exemplary algorithm 400 used (i) by the vectorization module 210 to obtain mathematical representations of text-based questions and (ii) by the question filtering module 212 to determine similarities between two questions in their vectorized forms, according to some embodiments of the present invention. The inputs to the algorithm 400 include two questions in their plain text form for the purpose of similarity comparison, one can be obtained from the data of past customer interactions 114 (as described above with reference to steps 302-308 of FIG. 3) and the other can be obtained from the repository 116 of questions that already have answers to. As shown, this process 400 generally comprises applying, for each of the two questions being compared, a preprocessing phase 402 followed by an embedding layer phase 404 and a Siamese long short-term memory (LSTM) modeling phase 406 to convert each question to its vectorized form. Thereafter, a prediction phase 410 is applied based on similarity computation 408 to determine a similarity score predicting the similarity between the two input questions.

During the pre-processing phase 402, a number of normalization functions are performed, including one or more of cleaning, contraction replacement, product variation normalization, acronym identification and replacement, lemmatization and singularization. Specifically, the cleaning step includes preprocessing each question, such as lower case conversion, removal of extra spaces, punctuation removal and regex-based replacements. The contraction replacement step replaces contractions in a question with their expanded forms (e.g., replacing "I've" with "I have" and replacing "hadn't'" with "had not"). The product variation normalization step involves normalizing variations of common product entities in a question into one token. Such normalization can be performed using a predefined mapping of the variations of different product and service names. The acronym identification and replacement step, which is optional, can be used to identify the presence of an acronym and replace that acronym with its appropriate expansion based on the usage of a predefined/user-defined mapping of acronyms to their corresponding definitions. For example, the question "What is an IRA?" can be expanded to "what is an Individual retirement account (IRA)?," and the question "What are IRAs?" can be treated the same as and expanded to "What is/are individual retirement account?". The lemmatization step can use Part of Speech (PoS) tagging to convert words that are identified as verbs in a question to their lemmas. The singularization step converts plural common nouns to their singular forms in a question. A PoS tagger can be used to identify the candidate words in a question for singularization processing. In some embodiments, results from the cleaning step, contraction replacement step, product variation normalization, and acronym identification and replacement step are used by both the vectorization module 210 in preparation for Siamese LSTM modeling 406 and the question filtering module 212 for similarity score computation 408, 410. In some embodiments, results from the lemmatization step and the singularization step are only used by the question filtering module 212 for similarity score computation 408, 410.

In some embodiments, during pre-processing 402, each of the two input question are further processed in preparation for the subsequent Siamese LSTM modeling phase 406. Siamese LSTM modeling 406 is used to convert an input question to its vectorized, mathematical representation by using two data sets for training and testing purposes. The testing set is created from the training set, where the size of the testing set is user configurable. In some embodiments, during pre-processing 402, the data in both the test set and the training set are tokenized. In some embodiments, the tokenized data from both sets is used to create model vocabulary. For example, each word in each data set is assigned a unique numeric identifier in the process of vocabulary creation. After vocabulary creation, a tokenized question is transformed into a list of numbers that are unique numerical identifiers of the respective words.

After pre-processing 402, each question is supplied to the embedding layer 404 that is configured to replace individual words from the input question with their mathematical representations. The resulting vector for each question is then passed to the LSTM modeling block 406 for further model training. The vector representation of a given question is adapted to change during training based on backpropagation weight updates as described in detail below.

In general, Siamese network is a type of neural network where weights of the network are shared between different input vectors which can be viewed as subnetworks. Weights of these subnetworks can be updated simultaneously. Long short-term memory (LSTM) is a type of artificial recurrent neural networks (RNNs) that have the capability to retain memory. This makes such a network a good choice when dealing with sequential data such as stock market price or textual data. To make a prediction at time t RNNs take all the outputs till time t−1 as input along with the input at time t. This makes the memory feature work in RNNs. These previous outputs are represented as hidden state in the RNNs. LSTMs have the capability to remember the features that are helpful in the prediction and forget the remaining from the previous states, which makes them more useful and provide longer memory. During Siamese LSTM modeling 406, a hyper-parameter search is performed to determine the optimal value for multiple parameters of the model and the model can be trained using Adam optimizer with accuracy as an optimization objective. An exemplary set of equations for LSTM modeling 406 is shown below:

| | |
|---|---|
| $i^{(t)} = \sigma(W^{(i)}x^{(t)} + U^{(i)}h^{(t-1)})$ | (Input gate) |
| $f^{(t)} = \sigma(W^{(f)}x^{(t)} + U^{(f)}h^{(t-1)})$ | (Forget gate) |
| $o^{(t)} = \sigma(W^{(o)}x^{(t)} + U^{(o)}h^{(t-1)})$ | (Output/Exposure gate) |
| $\tilde{r}^{(t)} = \tanh(W^{(c)}x^{(t)} + U^{(c)}h^{(t-1)})$ | (New memory cell) |
| $c^{(t)} = f^{(t)} \circ \tilde{r}^{(t-1)} + i^{(t)} \circ \tilde{r}^{(t)}$ | (Final memory cell) |
| $h^{(t)} = o^{(t)} \circ \tanh(c^{(t)})$ | (Hidden state) |

In some embodiments, an output of LSTM modeling 406 is a vector representation of the input question, such as in the form of a 75-dimensional vector representation. In alternative embodiments, other deep learning techniques can be employed to produce the same output, as understood by a person of ordinary skill in the art.

After the vectorized form of the two input questions are obtained, prediction 410 can be made regarding the similarity of these two questions based on the application of a similarity operation 408, such as a cosine similarity operation. During the prediction phase 410, different prediction techniques can be used to produce a similarity score. One technique is a Siamese only prediction technique that uses inputs in the same format as the format used for the modeling phase 406. Each input question pair is subjected to the pre-processing, normalization and vectorization via LSTM modeling steps 402-406. The vectorized outputs representing the input questions are scored during the prediction stage 410 to quantify their similarity to each other. The score varies between −1 to 1 if a cosine similarity technique is employed at the similarity computation stage 408.

Another prediction technique is an ensemble prediction technique that has additional features beyond scoring of the outputs produced from the modelling phase, as in the Siamese only prediction technique. The additional features of the ensemble prediction technique generally improve the prediction of similarity performance. Specifically, the ensemble technique computes four different types of scores to measure similarity: (1) a similarity score, such as cosine similarity score, of normalized/pre-processed question pairs using the Siamese model or another deep learning model (hereinafter referred to as a normalized score); (2) a similarity score of question pair Siamese model without changing, normalizing, and/or pre-processing the question pair (hereinafter referred to as a un-normalized score); (3) a syntactic fuzzy match score of question pair (hereinafter referred to as a fuzzy match score); and (4) a similarity score (e.g., cosine similarity score) based on the average embedding of both input questions using the retrained embedding matrix from the embedding layer 404 (hereinafter referred to as an average embedding score). A model can be trained that combines these four types of scores by applying a grid search on selected range of these scores while subjected to a system of six rules, where each rule is a combination of two of the four scores. Whenever a question pair clears one or more of these rules, the average similarity score of the constituents of the rule is returned with the highest confidence. An exemplary list of the six rules is shown below:

Rule 1 is triggered if fuzzy_match_score>=v0 and norm_score>=v1

Rule 2 is triggered if fuzzy_match_score>=v2 and unnorm_score>=v3

Rule 3 is triggered if norm_score>=v4 and unnorm_score>=v5

Rule 4 is triggered if norm_score>=v6 and score_avgembed>=v7

Rule 5 is triggered if unnorm_score>=v8 and score_avgembed>=v9

Rule 6 is triggered if fuzzy_match_score>=v10,

Where v1 . . . v10 are different thresholds, such as for example [0.4, 0.9, 0.45, 0.85, 0.9, 0.8, 0.9, 0.25, 0.9, 0.55, 0.65].

In some embodiments, add-on calculations are applied during the prediction stage 410 to improve modeling accuracy and coverage for short questions with acronyms. These add-on calculations are applicable to both the Siamese only prediction technique and the ensemble prediction technique. One add-on function is an acronym expansion function that treats acronym in a question and its known expansions as the same. Another add-on function is a query-to-question expansion function for definition-related queries. For example, the term "power of attorney" is mapped to a question like "what is power of attorney?" or "define power of attorney."

In some embodiments, the vectorization module 210 of the question discovery module 110 executes a portion of the process 400, including the preprocessing phase 402, embedding layer phase 404 and the LSTM modeling phase 406, to obtain the vectorized form of a question. In some embodiments, the question filtering module 214 of the question discovery module 110 can execute a portion of the process 400 (e.g., the similarity computation and scoring stages 408, 410) or the entire process 400 to determine a similarity score between two questions. In general, the framework of process 400 of FIG. 4 facilitates modular implementation with portions that can be executed at different times by different components of the system 100. For example, the process 400 can be implemented in its entirety for training data and making similarity predictions or used for its prediction stage 410 on a pre-trained model to make similarity predictions.

Referring back to FIGS. 2 and 3, the question filtering module 214 is configured to match an incoming customer question identified from the interaction data 114 to at least one of the questions stored in the repository 116 to predict whether the incoming question is already answered. This prediction, which uses the process 400 of FIG. 4 as explained above, requires the incoming question to be compared with all the questions in the repository 116, which can be a time-intensive operation. To facilitate computation, the embedding of the questions in the repository 116 (determined at the embedding layer stage 404 of the process 400) is only calculated once and stored for future reference. Thus, only embedding of an incoming question is calculated. Further, because vectorized mathematical forms of the incoming question embedding and the embedding of the questions in the repository 116 are used to compute the similarity scores (by the process 400), this makes the scoring and prediction determination fast and appropriate for real-time applications.

Figure 5:
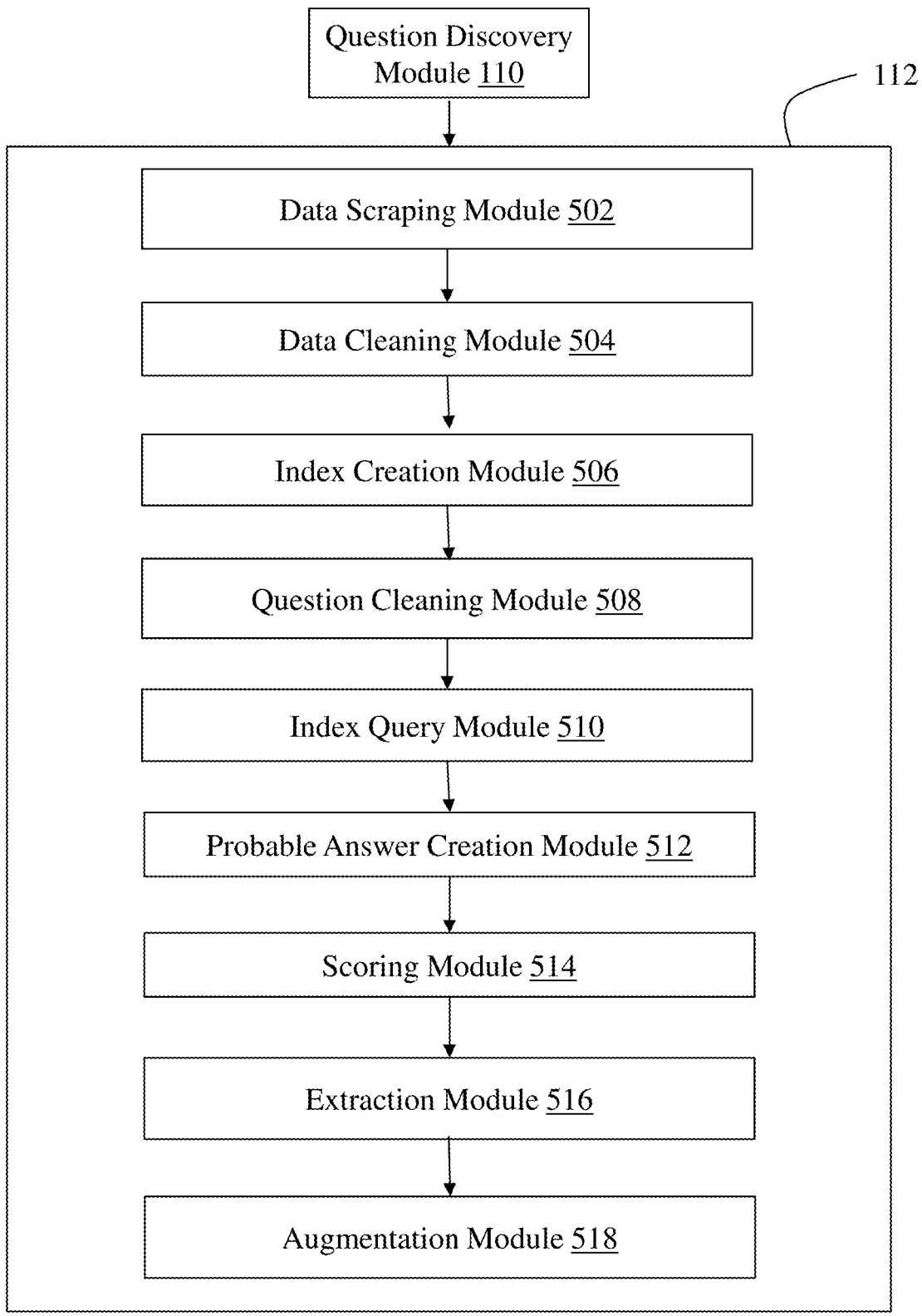
FIG. 5 shows an exemplary diagram of the answer mining engine of the system of FIG. 1, according to some embodiments of the present invention.
Figure 6:
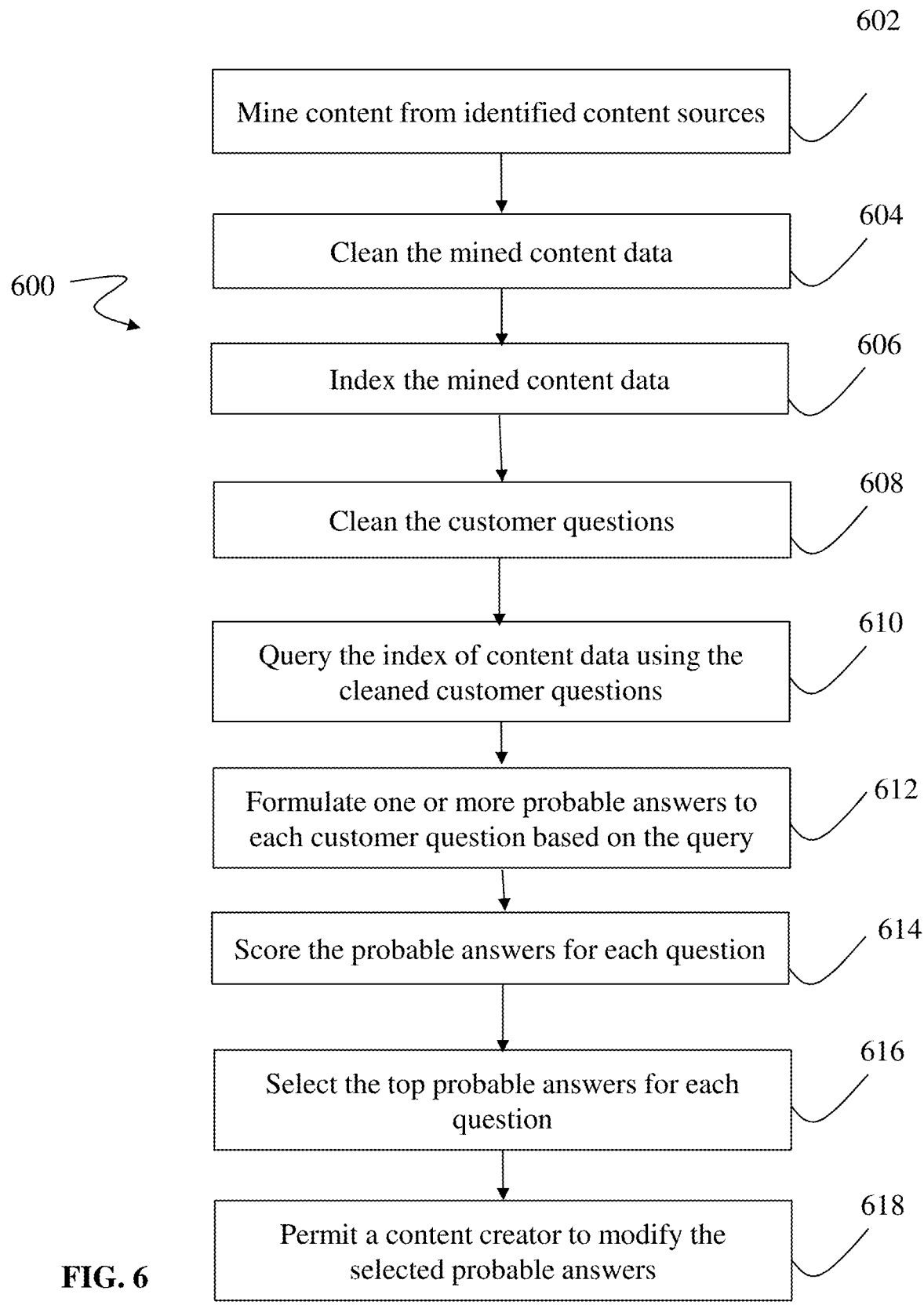
FIG. 6 shows an exemplary process executed by the answer mining engine of FIG. 5 to automatically determine answers to customer questions, according to some embodiments of the present invention.

In another aspect, the present invention includes an answer mining engine 112 configured to use data mining and other content creation techniques to determine probable answers to questions, such as questions that do not have existing answers as determined by the question discovery module 110 of FIG. 1. FIG. 5 shows an exemplary diagram of the answer mining engine 112 of the system of FIG. 1, according to some embodiments of the present invention. As shown, the answer mining engine 112 can include one or more of a data scraping module 502, data cleaning module 504, index creation module 506, question cleaning module 508, index query module 510, probable answer creation module 512, scoring module 514, extraction module 516 and augmentation module 518, which will be described in detail in relation to the process of the FIG. 6. Specifically, FIG. 6 shows an exemplary process 600 executed by the answer mining engine 112 of FIG. 5 to automatically determine answers to customer questions, according to some embodiments of the present invention. This process 600 can be a stand-alone process or a second stage (i.e., an answer mining phase) of a two-stage process for determining answers to one or more customer questions related to a business enterprise.

In some embodiments, inputs to the answer mining engine 112 is a prioritized list of representative questions that needs to be answered (from the question filtering module 212 of the question discovery module 110), where each representative question is associated with a strength value indicating the relative importance of the question and its priority for answer determination. The answer mining engine 112 is adapted to determine at least one probable answer to each of the prioritized list of questions by automatically mining pertinent data from one or more identified content sources. In some embodiments, the probable answers can be reviewed and/or altered by a human operator (e.g., a content creator) via a user interface of the client computing device 102.

The data scraping module 502 of the answer mining engine 112 is configured to learn and understand the structures of the identified content sources and mine/scrape the content accordingly (step 602). For example, because different webpages associated with the business enterprise have different structures, the data scraping module 502 is configured to understand and process the different structures accordingly. In some embodiments, the data scraping module 502 recognizes three categories of webpages—reference point category, general web content category and glossary category. The reference point category of webpages serves as a resource for service representatives and include useful answers to common customer queries. For example, if the business enterprise is in the financial service sector, webpages in this category can include details about various topics like trading, money movement, planning and wealth, etc. The general web content category of webpages are typically dedicated to a single or limited number of topics. The glossary category of webpages include definitions for terms used by the business enterprise. Webpages of different categories have different structures and formats that can be learned and recognized by the data scraping module 502.

The data cleaning module 504 is configured to clean the data scraped/mined by the data scraping module 502 (step 604). The different types of webpages generate different types of data, which also require different steps for cleaning. The common cleaning steps for data mined from all webpages include removal from the data HTML tags, standard boilerplate language, HTML encodings, etc. Often web content include hyperlinks to direct customers, and these links create noise in the data scraped. Therefore, such hyperlinks can be removed during the data cleaning stage. For webpages of general content, images and video data, as well as non-informative language such as "Contact us/Questions?/Need help?" can be removed. For glossary webpages, links to sub-definitions within the glossary term definitions can be removed. For reference point webpages, tabular information can be extracted to retain the relevant content while discarding the tabular format.

The index creation module 506 is configured to index the mined and cleaned content for use in an elastic-search approach (step 606). The index creation module 506 can divide the content into sections and extract important information from these sections as index to these sections to facilitate content retrieval. For example, terms such as noun phrases, verb phrases and useful unigrams that are specific to the business enterprise are extracted from the sections and stored in separate fields in the index. The extracted terms can be maintained in the same order in which they appear in the content. These terms can constitute the set of key phrases to index the content and are given importance while looking for sections relevant to a given question. In some embodiments, glossary terms extracted from glossary-type webpages are stored in the form of a question-answer index. Each term is attached with "What is" in the front and the answer is stored along with important phrases as well. For example: glossary term "sales load" is converted to question "What is sales load?"

The question cleaning module 508 is configured to process/clean the top customer questions for which there is no answer (e.g., received from the question discovery module 110) to extract key terms for elastic search query creation (step 608). Specifically, the question cleaning module 508 can extract noun phrases present in the. The question cleaning module 508 can also extract verbs/verb phrases from the questions as they also can be important. For example, "How to open an account" and "How to close an account" are both the same except for the presence of the verb "open/close," but these questions necessitate different answers. In some embodiments, phrases (e.g., product names) specific to the business enterprise are also extracted to help search and retrieval. In some embodiments, question words like what, how, why, etc. are mined from the questions.

The index query module 510 is configured to query the elastic-search index for the mined content created by the index creation module 506 using the cleaned questions and extracted key phrases by the question cleaning module 508 (step 610). For each question that needs an answer, the index query module 510 is able to dynamically formulate a query to search the index and, when a match is found, retrieve one or more content sections corresponding to the matched index pertaining to the question. In some embodiments, importance is given to noun phrases, verb phrases, company-specific phrases and question words present in the given question. In some embodiments, the matching criteria do not require exact matching between the key phrases of the questions and fields of the index, only to a predetermined degree of tolerance. In some embodiments, the index query module 510 retrieves all the sections matching a given question in accordance with the corresponding matched index. These sections can be returned in a ranked order based on their relevance to the question, which can be used to filter out noisy and/or irrelevant sections.

The probable answer creation module 512 is configured to formulate at least one probable answer from the top number of sections (e.g., the top 5 sections) that are retrieved by the index query module 510 (step 612). The probable answer creation module 512 can adopt a sliding window based approach to decompose the sections into probable answers. For example, a moving window of '3' sentences can be taken and the process is followed by moving the sliding window ahead by one sentence.

Figure 7:
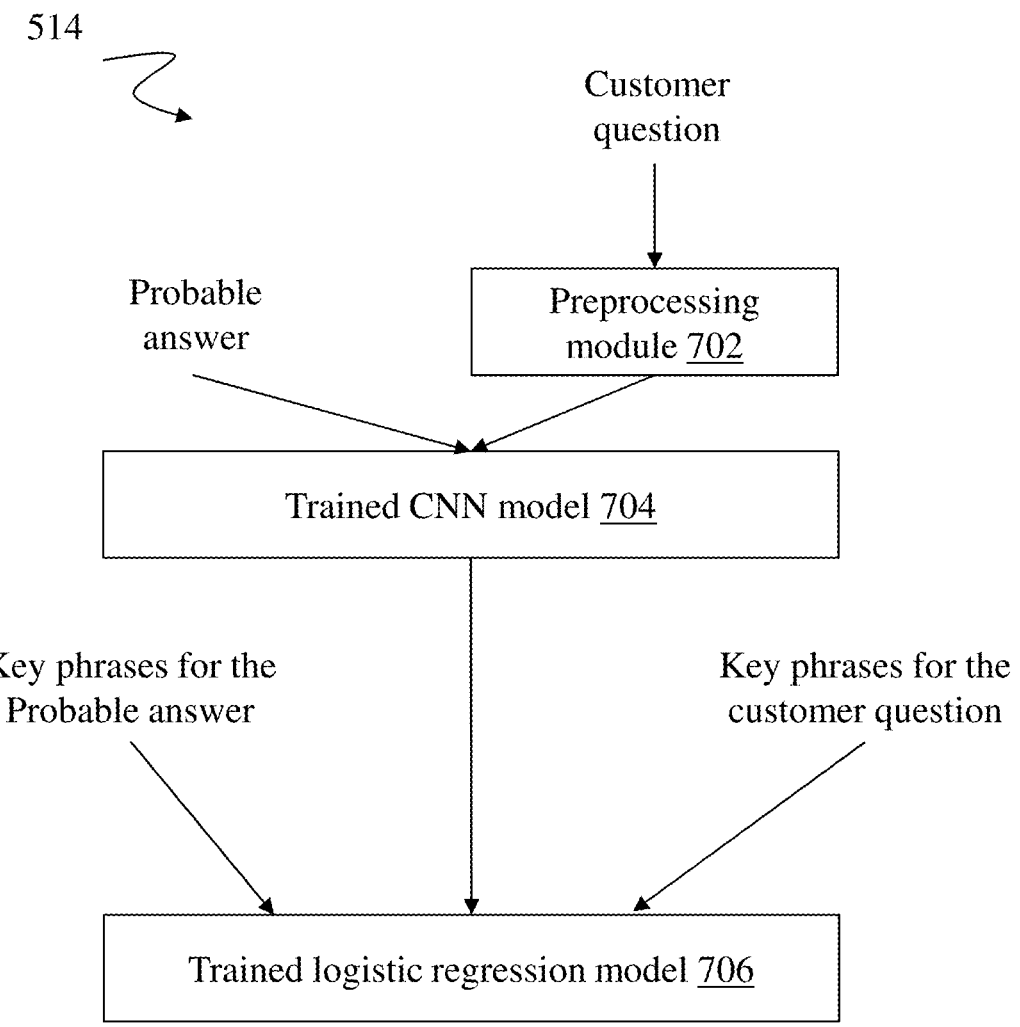
FIG. 7 shows an exemplary diagram of the scoring module of the answer mining engine of FIG. 5, according to some embodiments of the present invention.

The scoring module 514 is configured to score each probable answer to a question using a deep learning model so as to quantify the answer's relevance to the question (step 614). In some embodiments, the scoring module 512 uses a supervised learning algorithm, such as a convolutional neural network (CNN) based answer extraction model, to score the probable answer snippets in relation to a given customer question. FIG. 7 shows an exemplary diagram of the scoring module 514 of the answer mining engine of FIG. 5, according to some embodiments of the present invention. As shown, the customer question is first preprocessed at a preprocessing module 702 that can perform a number of functions including cleaning (e.g., lower case conversion, removal of extra spaces and punctuation removal, etc.), contraction replacement (e.g., replaces the contractions to their expanded form), acronym replacement (e.g., replaces an acronym with its appropriate expansion using predefined/user-defined mapping of acronym and their definitions), and definition question check (e.g., if the customer query starts with a noun phrase, add "What is" at the beginning of the question if it does or if the customer query starts with a verb phrase, add "How do I" at the beginning of the question).

The preprocessed customer question from the preprocessing module 702 and a probable answer for the customer question are supplied as inputs to a trained CNN model 704 that is configured to generate an initial score quantifying the strength of the probable answer for addressing the customer question. In some embodiments, the trained CNN model 704 of the scoring module 514 is created by training the model on data that belongs to the business enterprise, such as data from the Frequently Asked Questions (FAQs) webpages of the business enterprise. The data can be preprocess by, for example, removing duplicate parts, answers with less than a certain number of sentences and/or more than a certain number of sentences, and questions with no question mark. The preprocessed data can be divided into training data, development data and test dataset. In some embodiments, negative sampling is used to select the data. For example, if the same webpage has more FAQs, random sample of answers for different questions is used. Else, random sample of answers from different pages is used to create the negative sample. During model training, word vectors are retrained using reference point data and general content data mined from various webpages of the business enterprise (as described above with reference to the data scraping module 502 at step 602). These word vectors are used to create sentence embedding for questions. Using this trained semantic word embedding, the CNN model 704 is trained to learn semantic matching between question and answer pairs. This trained CNN model 704 is sensitive to word ordering, configured to capture features of n-grams independent of their positions in the sentences, and capable of corresponding to the internal syntactic structure of sentences, thereby removing reliance on external resources such as parse trees. An exemplary equation used for CNN modelling 704 is shown below:

$$s = \sum_{i=1}^{|s|-1} \tan h(T_L s_i + T_R s_{i+1} + b),$$

where $s_i$ is the vector of the i-th word in the sentence, and s is the vector representation of the sentence. Both of these vectors are in $R^d$. Variables $T_L$ and $T_R$ are model parameters in $R^{d \times d}$ and b is bias.

The score from the CNN model 704, along with the key phrases extracted for the probable answer (by the index creation module 506 at step 606) and the key phrases extracted for the customer question (by the question cleaning module 508 at step 608), are then supplied as inputs to a trained logistic regression model 706 to obtain a final score of the likelihood of the probable answer being the true answer to the customer question. In some embodiments, the logistic regression model 706 of the scoring module 512 is trained with three features: (i) word co-occurrence count of the key phrases extracted for the probable answer and input question, (ii) Inverse Document Frequency (IDF) weighted word co-occurrence count of the key phrases, and (iii) question-answer matching probability as provided by the CNN model 704. This trained logistic regression model 706 is applied after the application of the CNN model 704 on a question-probable answer pair to provide a final score predicting the likelihood of the probable answer being a true answer to the customer question. An exemplary set of equations for regression modeling 706 is shown below:

$$n\left(\frac{p}{1-p}\right) = a_0 + a_1 x_1 + a_2 x_2 + a_3 x_3,$$

where p represents the probability that the given answer is corresponding to the given question, $x_1$ is the word co-occurrence count of the key phrases from question and answer, $x_2$ is the IDF weighted word co-occurrence count of the key phrases from question and answer, $x_3$ is the score from the CNN model, and $a_i$ for $i \in (0, 1, 2, 3)$ are the model parameters.

Referring back to FIGS. 5 and 6, the extraction module 514 is configured to select, for each unanswered customer question, the probable answers with final scores from the scoring module 512 that exceed a predefined threshold (step 616). For example, the top 5 scoring results can be selected as an output while removing low-scoring/irrelevant probable answers.

The augmentation module 518 is configured to allow a content creator to review, augment or otherwise modify the mined probable answers for a given customer question from the extraction module 514 (step 618). In some embodiments, the augmentation module 516 can also provide a link to the original webpage from which the answer is extracted as a reference for the content creator. Based on the selection and/or modification of answers by the content creator, the various models used in the answer mining engine 112 receives the appropriate feedback and can be automatically updated for improvement. In some embodiments, the final question and answer selected and/or modified by the content creator is added to the question-answer repository 116 such that the answer to the same question would not need to be mined again in the future by the answer mining engine 112.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer-implemented method for automatically determining answers to a plurality of questions, the method comprising:
    automatically discovering, by a computing device, a plurality of questions by processing historical data related to prior customer interactions, the automatically discovering comprises:
        applying, by the computing devices, a linguistic analytical model on the data related to historical customer interactions to detect the plurality of questions;
        vectoring, by the computing device, the plurality of questions to generate mathematical representations of the questions, wherein each mathematical representation preserves syntactic and sematic meaning of the corresponding question; and
        grouping, by the computing device, the plurality of questions into one or more clusters in accordance with similarities of the questions as measured based on their mathematical representations, wherein each cluster is assigned a representative question; and
    automatically determining, by the computing devices, at least one probable answer to each of the representative questions using a content mining technique that mines pertinent data from one or more identified content sources, wherein automatically determining the at least one probable answer comprises:
        indexing, by the computing device, the mined data based on key phrases extracted from the mined data;
        querying, by the computing device, the indexed data using the representative question from each of the one or more clusters to determine one or more sections of the indexed data that match the representative question to within a predetermined degree of tolerance; and
        formulating, by the computing device, the at least one probable answer for the representative question of each cluster by applying a supervised learning algorithm that predicts a degree of match between each of the one or more matched sections and the corresponding representative question.

2. The method of claim 1, wherein vectoring the plurality of questions comprises applying a Siamese deep learning model on the plurality of questions to generate the mathematical representations of the questions.

3. The method of claim 1, wherein grouping the plurality of questions comprises applying an agglomerative hierarchical clustering algorithm to generate the one or more clusters and wherein an average similarity of the questions with each other in each cluster is above a predefined threshold.

4. The method of claim 1, wherein the representative question of each cluster has the highest average similarity with the other questions of the same cluster.

5. The method of claim 1, further comprising:
    determining, for each cluster, a strength level indicating a combined frequency of occurrence of the questions in the cluster; and
    correlating the representative question of the cluster with the strength level.

6. The method of claim 1, further comprising for each incoming question, querying a database to determine if there exists an answer to the incoming question prior to automatically determining a probable answer using the content mining technique.

7. The method of claim 6, wherein querying the database comprises:
   calculating a similarity score between the incoming question and each question in the database using an ensemble deep learning model for similarity detection, and
   marking a question in the database as same to the incoming question if the similarity score is above a predefined threshold.

8. The method of claim 7, wherein the ensemble deep learning model is based on a plurality of scores that measure different types of similarity between a pair of the incoming question and a question in the database.

9. The method of claim 8, wherein the plurality of scores comprises a normalized score of preprocess question pair from using a Siamese deep learning model, an un-normalized score of the question pair without preprocessing using the Siamese deep learning model, a syntactic fuzzy match score of the question pair, and a cosine similarity score of the question pair based on average embedding of each question in the question pair.

10. The method of claim 1, wherein formulating the at least one probable answer comprises:
    decomposing the one or more matched sections into a plurality of probable answers;
    scoring the probable answers using the supervised learning algorithm to predict a degree of match between each probable answer and the corresponding representative question; and
    extracting, from the plurality of probable answers, the at least one probable answer that has a degree of match greater than a predetermined threshold.

11. The method of claim 10, wherein the supervised learning algorithm is a convolutional neural network based answer extraction algorithm.

12. The method of claim 1, further comprising transmitting the one or more probable answers to a content creator to perform at least one of verification or modification.

13. A computerized system for automatically determining answers to a plurality of questions, the computerized system comprising:
    a question discovery engine for automatically discovering a plurality of questions by processing historical data related to prior customer interactions, the question discovery engine comprises:
       a question detection module configured to apply a linguistic analytical model on the data related to historical customer interactions to detect the plurality of questions;
       a question vectorization module configured to vectorize the plurality of questions to generate mathematical representations of the questions, wherein each mathematical representation preserves syntactic and sematic meaning of the corresponding question; and
       a question clustering module configured to group the plurality of questions into one or more clusters based on similarities of the questions as measured based on their mathematical representations, wherein each cluster is assigned a representative question; and
    an answer mining engine for automatically determining at least one probable answer to each of the representative questions using a content mining technique, the answer mining engine comprises:
       a data scraping module configured to mine pertinent data from one or more content sources;
       an index creation module configured to index the mined data based on key phrases extracted from the mined data;
       an index query module configured to query the indexed data using the representative question from each of the one or more clusters to determine one or more sections of the indexed data that match the representative question to within a predetermined degree of tolerance; and
       an extraction module configured to formulate the at least one probable answer for the representative question of each cluster by applying a supervised learning algorithm that predicts a degree of match between each of the one or more matched sections and the corresponding representative question.

14. The system of claim 13, wherein the question vectorization module is configured to apply a Siamese deep learning model on the plurality of questions to generate the mathematical representations of the questions.

15. The system of claim 13, wherein the clustering module is configured to apply an agglomerative hierarchical clustering algorithm to generate the one or more clusters, and wherein an average similarity of the questions with each other in each cluster is above a predefined threshold.

16. The system of claim 13, further comprising a database configured to maintain questions to which an answer exists.

17. The system of claim 16, further comprising a question filtering module configured to apply an ensemble deep learning model to compare each of the plurality of questions discovered to the questions in the database for determining if the question discovered already has an answer.

18. The system of claim 13, wherein the extraction module formulates the one or more probable answer by:
    decomposing the one or more matched sections into a plurality of probable answers;
    scoring the probable answers using the supervised learning algorithm to predict a degree of match between each probable answer and the corresponding representative question; and
    extracting, from the plurality of probable answers, the at least one probable answer that has a degree of match greater than a predetermined threshold.

19. The system of claim 13, further comprises an augmentation module configured to allow the one or more probable answers to be at least one of verified or modified by a content creator.

* * * * *